May 20, 1958     T. H. STIEBEL     2,835,782
APPARATUS FOR PREPARING COFFEE BEVERAGES

Filed April 23, 1957     2 Sheets-Sheet 1

INVENTOR
THEODOR H. STIEBEL
BY
ATTORNEY

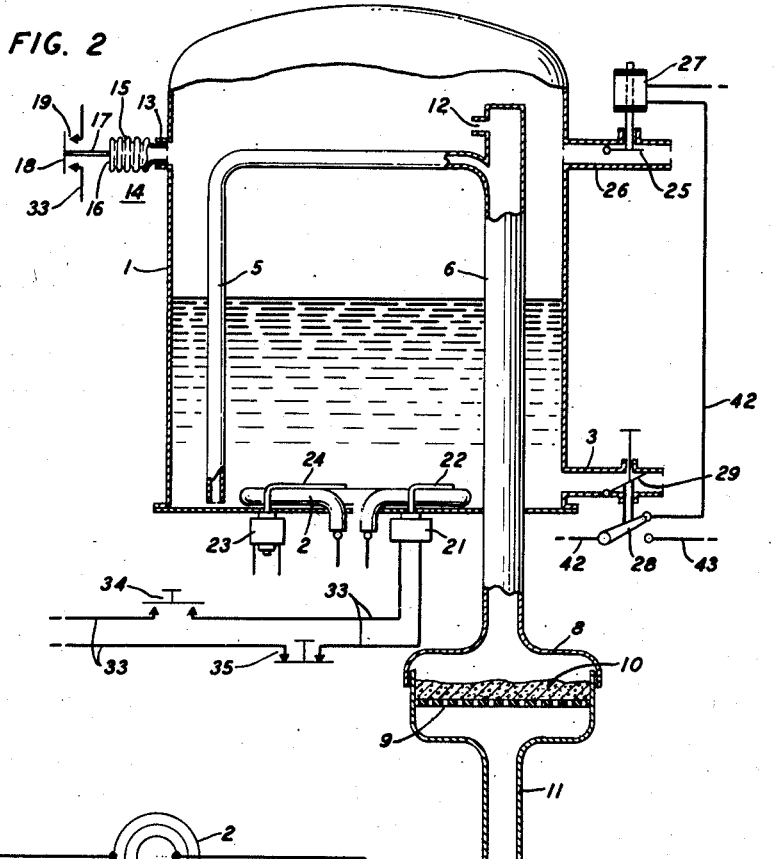
FIG. 2
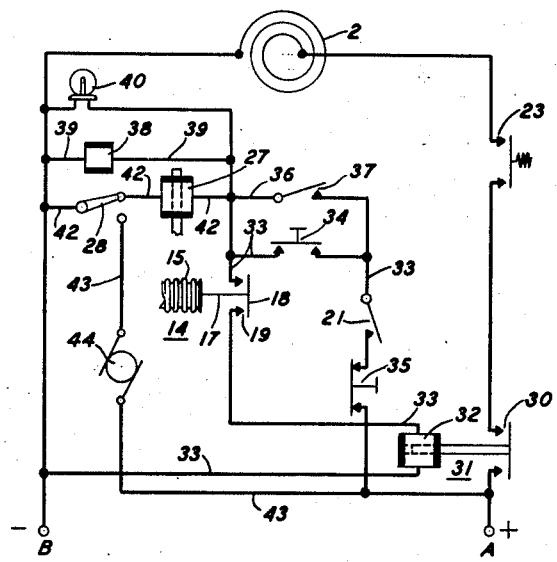
FIG. 3
INVENTOR
THEODOR H. STIEBEL
BY
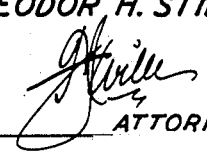
ATTORNEY

United States Patent Office 2,835,782
Patented May 20, 1958

2,835,782

APPARATUS FOR PREPARING COFFEE BEVERAGES

Theodor H. Stiebel, Holzminden (Weser), Germany

Application April 23, 1957, Serial No. 654,527

5 Claims. (Cl. 219—44)

The instant invention relates to coffee beverage preparation apparatus, and more particularly to coffee preparing machines in which water is heated to boiling in a closed container, and, on continued heating thereof, the pressure of the generated steam forces the boiling water to outflow from the container, by way of a riser and a gravity tube, through a filter holding the ground coffee from which the beverage is brewed.

While coffee prepared by brewing machines of the above type can be most excellent in that the machines operate at temperatures a few degrees above the boiling point, this type of coffee brewer has not met with a ready reception heretofore in restaurants or in galleys, particularly aircraft galleys. One reason therefor is that the time required to fill the container with water is relatively long in that the entrapped air can escape to the outside atmosphere from within the container with rising water level but slowly by way of a pressure equalizing aperture in the outlet or gravity tube, and against the resistance offered by the ground coffee on the filter. In view of the limited electrical power available for any such purpose in airplanes particularly, coffee machines installed in aircraft are usually supplied from gravity feed water tanks, or at best aided by the smallest of pumps, and thus the problem of how the filling time might best be cut down arose.

Another reason for the unfavorable reception of prior art coffee brewers of the type here discussed, is the time loss resulting from the continued flow of the hot coffee after the electric line supply to the heating element is disconnected. The outflow continued because the heat remaining in the heating element is adequate to maintain, for a time after the electrical line supply is switched off, the steam at its working pressure thus continuing the displacement of boiling water. This continued outflow considerably increases the idle time of the machine, particularly when it is required at once to make the next batch of coffee and hence to recharge the filter with fresh ground coffee. Even when this continued outflow has ceased, it is not possible to renew the charge since the steam under pressure still within the container can escape but slowly through the used ground coffee charge. If it be recalled that in airplanes cabin pressure is about 0.7 atmosphere, and the operating pressure of this type of coffee brewer is from about 1.05 to 1.1 atmospheres, corresponding to from 100.5° C. to 102.0° C., there is apparent the danger of steam burns were the filter to be opened and the steam permitted suddenly to escape. In any event, moisture would be introduced into the neighboring atmosphere, which is particularly not desirable in airplanes.

On the other hand, if there is no particular hurry about changing the filter charge, the steam within the container cools and condenses. As is well known, there is a marked volume decrease in the conversion from steam into water, and this decreased pressure will cause air to be sucked into the container through the charged filter, which air will carry particles of the coffee charge into the container with it. This ingress of coffee particles can be to such an extent that coffee particles appear in the gage glass of the container.

Coffee machines of the above type are frequently provided with temperature controllers and regulators protecting the machine against further heating in the absence of water within the closed container, against over-heating, against generation of excessive pressure, as also relay switches and manually operable on and off switches.

An object is to reduce the total time required to prepare coffee with machines of this type by increasing the speed with which the container thereof may be filled with fresh water on the one hand, and providing means to cause the outflow of boiling water promptly to cease on cutting the supply of electrical energy to the heating coils of the machines.

Another object of the instant invention is to provide a pressure regulator for the generated steam for controlling both the pressure of the steam and the rate of hot water displacement thereby as also the temperature of the water so that full-bodied, rather than thin, coffee is obtained without the peculiar flavor resulting from leaching the bitter ingredients from the coffee.

Still another object of the invention is to provide means to overcome the aforementioned disadvantages of excessive time for filling the container with water, of afterflow of the hot beverage, and of influx of coffee particles into the container per se, by simple and automatic means so that but a minimum of manual operations are required on the part of the user of the coffee machine.

I accomplish the foregoing, and other, objects by providing an adjustable pressure controller which on a given high pressure will either open a vent valve or open the heating coil circuit. Generally speaking, I prefer to have the pressure controller open the heating coil circuit in that an electric contact can be opened rather instantly and without energy loss, and the loss of moisture and unused heat of blown off steam is avoided. The pressure of the steam, as also of the rate of displacement of the boiling water through the riser and outlet or gravity tubes is thus readily regulated. By regulation of the steam pressure and rate of boiling water displacement, I mean not only holding both at a constant value but also changing both to other constant values. This is required because the temperature required for the best preparation of certain types of coffee, for example "expresso" coffee, is higher than for the normal coffees. In addition, the selected temperature of brewing the coffee may result in too rapid a rate of outflow. In such case it is desirable to increase the resistance to outflow to obtain the desirable magnitude thereof. For such purpose a variable throttle or choke may be provided at an externally accessible portion of the outflow tube, for example in advance of the filter holding the ground coffee. The variable throttle also permits adjustment for the different flow resistance of the various types, as also fineness of grind, of the ground coffee from which the beverage is brewed. I also provide a vent valve which is automatically operated to open at low pressure on filling the container with water, is held closed during the displacement of the boiling water at the higher pressures, and on opening of the line to the heating coil is opened to vent the container at the same higher pressures. The vent valve is electromagnetically controlled so that on opening a water inlet valve and on opening the heating coil circuit, either automatically by the device protecting the container against heating while dry, that is, empty of water, or manually by a push button, the vent valve opens. On manual closure of the line circuit to the heating coil, the vent valve is automatically closed. At the same time I cause this vent valve to function as a safety device against excessive pressure building up within the container. I do this by so dimensioning the coil of the electromagnet actuating the vent valve so that its valve closing pressure is but slightly in excess of the pressure permissible within the container, with the result that pressure in excess thereof lifts the valve from its seat, permitting steam to escape.

The various features of my instant invention will be more readily understood from the following detailed description of two illustrative embodiments, taken in conjunction with the appended drawing, in which:

Figure 2 is a similar diagram of a second illustrative embodiment thereof, and

Figure 3 is a wiring diagram of the coffee machine of Figure 2.

Figure 1:
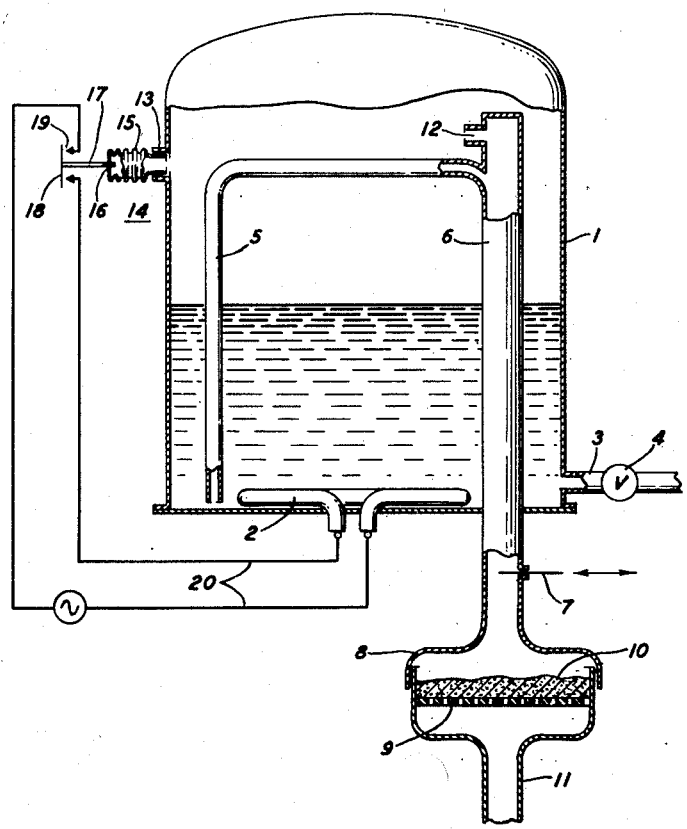
Figure 1 is an elevational, and highly simplified, diagram of a first illustrative embodiment of the coffee machine of my invention.

Referring to the drawing, in the figures of which like reference characters indicate like parts, the coffee machine of the embodiment of Figure 1 incorporates a pressure valve which, when the pressure within the machine exceeds a predetermined amount opens the line supply to the heating coil and closes it when such pressure has again dropped therebelow. The closed container 1 has an electric heating coil 2 at the bottom thereof and a short filling pipe 3, controlled by a shut-off valve 4, through which water may be admitted. A riser tube 5, having its open end below the horizontal plane of the top of the coil 2, and spaced from the bottom of the container, is connected at its upper end to the upper end region of the gravity or outflow tube 6 extending through the bottom of the container. In the portion of the gravity tube below the container, a throttle 7 may be provided to vary the cross-section of the tube at such region. The lower end 8 of the outflow tube is of enlarged cross-section adapted to receive a container or filter 9 having a perforated support on which the ground coffee 10 is placed, the container being readily removable from the enlarged end of the gravity tube for cleaning and recharging with ground coffee. The filter has an outlet 11 through which the prepared beverage flows into any desired receptacle. At a region of the gravity tube 6 above the plane of its interconnection with the riser tube 5, an air escape and pressure equalizing aperture 12 is provided for the purposes hereinafter described, and is above the level to which water is filled into the container.

At an upper portion of the container 1 and above the level of the water therein, that is, at some point in the air and steam region of the container, by way of a small length of pipe 13, a pressure regulator 14 is connected to the interior of the container, and consists, for example, of flexible bellows 15 having an end plate 16 of rigid material, metal for example, into which a rod 17 may be screwed to a greater or lesser extent. The rod 17 carries and armature 18 at its free end which spans a pair of contacts 19 in the circuit 20 containing the heating coil 2, the circuit 20 being connectible by a manually operable switch, not shown, to the line supply. The rod 17 so moves the armature 19 that the latter moves from the contacts 18 on reaching the predetermined high pressure within the container and is returned thereby to engagement with the contacts as the pressure drops below the predetermined high pressure. It will be noted that the pressure at which regulator 14 opens the circuit of the heating coil may be varied in accordance with the amount rod 17 is threaded into plate 16.

On opening water inlet valve 4 and filling the container to the level below the air venting and pressure equalizing aperture 12, as determined by a level gage, not shown, of the usual type, the valve 4 is shut and circuit 20, including the heating coil 2, is connected to the electric line supply. The armature 18 being closed on contacts 19, the coil 2 is energized and the water in the container brought to the boiling point. In as much as when using the usual grades of coffee, the tastiest beverage coffee is obtained by brewing it with water at 100° C. to 105° C., and allowing for a drop in temperature of from 2° C. to 3° C. until the expelled water reaches the filter 9, the pressure regulator 14 is adjusted to open the heater circuit at a pressure within the container corresponding to a temperature of 108° C. and to reclose the circuit at a pressure corresponding to 103° C. For expresso coffee, such adjustment is for a circuit opening temperature of some 110° C. to 120° C.

It will be noted that as the water within container 1 is heated, the air within the container above the water expands and finds its way to the outer atmosphere through aperture 12, and that if such aperture were not provided the expanding air would displace water into the riser tube and cause outflow before the desired temperature is reached. At the boiling point for the pressure prevailing in the container, steam is formed suddenly and as is well known, in very great volume relative to the volume of water so converted. The steam displaces boiling water through the riser tube 5 and the gravity tube 6, so that it flows over the ground coffee 10 on the filter 9, thus brewing the beverage which flows from outlet 11. By continuing the heating, not only is displacement of boiling water maintained, but the temperature of the water remaining in the container and the pressure of the steam also continuously increase, until when a temperature of 108° C. is reached in the container, pressure regulator 14 severs the engagement between armature 18 and contacts 19, thereby disconnecting heating coil 2 from the line supply. Thus the temperature within the container is limited to a predetermined maximum, and with it the rate of outflow of the boiling water. On deenergization of the heating coil, the container temperature and pressure decrease until the minimum pressure is reached to which regulator 14 has been set, when armature 18 again bridges contacts 19.

In the embodiment of my instant invention shown in Figure 2, of which the electrical circuit schematic is shown in Figure 3, the coffee preparation device is provided with means 21 for protecting the machine against dry run heating including a first temperature responsive element 22, and a temperature controlled disconnect switch 23 which is opened automatically by means of a second temperature responsive element 24, while closable manually only, that is, cooling of the element 24 does not automatically reclose the switch 23. Both temperature responsive elements 22 and 24 are in direct heat transference contact with the outer surface of the heating coil 2. The pressure regulator 14, the dry run protective temperature regulator 21, and the temperature controlled disconnect switch 23 are so adjusted relative to each other that the pressure regulator 14 can function properly for the water displacement sequence, the dry run protective means 21 can open the circuit only after completion of the water displacement, that is, when the container 1 runs dry, and the temperature controlled disconnect switch 23 only in the event that the dry run protective regulator 21 fails to function, that is, disconnect switch 23 is adjusted to open the circuit at a temperature higher than that at which the dry run regulator 21 operates to open the circuit and below which it automatically recloses the circuit.

In addition, the container of the instant embodiment is provided with an electromagnetically controlled vent valve 25 disposed in a short length of pipe 26 from the air-steam region of the container, of which vent valve the electromagnetic coil 27 is connected in series with a two-position switch 28 automatically actuated on opening and closing the water inlet valve 29 in the short filler pipe 3.

The interconnection of the various electromagnetically controlled devices and manually operable switches is more readily apparent from the circuit schematic of Figure 3.

In the main circuit from the direct current line supply, between positive pole A and negative terminal B, there are in series the main contacts 30 of a relay 31 having a coil 32, the contacts of the temperature controlled circuit opening switch 23 and the heating coil 2. Relay coil 32 is connected in a control path 33 from one coil end to the negative line supply terminal B and from the other coil end through the contacts 19 and armature 18 of pressure regulator 14 to a manually operable circuit closing switch 34, spring biased to be open in normal position, to the temperature regulator 21 and a manually operable disconnect switch 35, spring biased to be closed in normal position, to the plus side of the line supply. Shunted around the manually operable closing switch 34 is a current path 36 including an armature operable by relay coil 38 to closure on contact 37, the relay coil 38 being in a connecting line 39 to the heating element circuit. Connected in parallel to the line 39, in individual lines, is a signal lamp 40 in one line 41, and in the other parallel line 42, the electromagnetic coil 27 of the vent valve 25 in series with the two-position switch 28 actuated by the water inlet valve 29. When the latter is opened, the parallel connection 42 is opened and simultaneously conductive connection is made to the connection 43, shunted across the line supply, in which an electrically driven water pump 44 is connected, actuating the pump.

It follows that on opening the water inlet valve 29, the two-position switch 28 being mechanically coupled thereto, is actuated to the position in which the electric line supply is connected to the electrically driven pump 44 to pump water into the container 1. With the two-position switch 28 so actuated, connecting line 42 is simultaneously opened, deenergizing coil 27, and releasing the armature of the vent valve 25 from its closing position and opening the vent valve. Thus the air within the container 1 is not compressed during the water filling operation, thereby delaying and hampering such operation, but is free to discharge from the container as the water rises therein. On closing the water inlet valve, the two-position switch is restored to its original position, closing line 42 to reenergize coil 27 and close vent valve 25 while opening line 43 and stopping water pump 44.

When the container 1 has been filled, as observable from the usual water gage (not shown), manual connecting switch 34 is operated to closure thereby closing circuit 33. With circuit 33 closed, coil 32 of relay 31, and coil 25 of the vent valve, are both energized, the armature of relay 31 closing the heating coil circuit and that associated with coil 27 closing vent valve 25. But on closing connect switch 34, a current path is also closed from the negative side of the line supply through line 39, relay coil 38, control current path 33, manual connecting switch 34, temperature actuated switch 21, and manually operable disconnect switch 35, to the positive side of the line supply, since dry run switch 21 and disconnect switch 35 are each in their normal, circuit closing, position. Energizing coil 38 actuates contact 37 to closure so that current flows in shunt path 36, with the result that even though manual pressure on the manual connect switch 34 be released, permitting it to restore to its normally open position, the curent through path 36 continues to flow, maintaining the continuity, in turn, of the heating coil circuit.

The heating of the water to the boiling point and the subsequent displacement of the boiling water in the instant embodiment proceeds as in the device of the first illustrative embodiment. Pressure regulator 14 of the instant embodiment is electrically in control current path 33, opening such circuit on excessive pressure within the container and closing it when the pressure is therebelow, thereby opening and closing the main circuit to the heating coil through relay 31. The water having been displaced from the container so that the heating coil runs dry, the temperature of the heating coil rapidly increases, as is known. This rapidly increased temperature soon operates the temperature controlled switch 21 by way of its heat probe 22 to its circuit opening position. With switch 21 opened, both the relay coil 38 and coil 27 of the vent valve 25 become deenergized, the latter coil releasing its armature to open the air vent to permit the residual steam in the container to escape, thereby dropping the pressure within the container suddenly to atmospheric, and at the same time suddenly terminating the residual displacement of water from the container. Thus no afterflow of beverage is possible, and the filter 9 may be removed without danger to the person so doing. The above disconnect sequence is exactly the same, on operation of the manually operable disconnect switch 35 by pressing its armature against the tension of its maintaining spring from its normal contact engaging position to disengage from its contacts.

In both modes of opening the circuit, relay coil 38 is deenergized, thus releasing its armature 37, opening shunt circuit 36 as well as control circuit 33 since manually operable connect switch 34 has restored to its normal open position promptly on releasing manual pressure thereon. As a consequence, when the temperature switch 21 recloses automatically, as the result of its heat responsive element 22 cooling off, relay 31 cannot reclose the heating coil circuit for the relay contact 37 and the manual connect switch 34 remains open.

In the event that both the pressure regulator 14 as well as the automatic temperature switch 21, which is set to operate at a higher temperature than the temperature corresponding to the pressure at which pressure regulator 14 is to be actuated, fails to operate, or the relay 31 fails, temperature disconnect switch 23 is actuated by the further increase in temperature of the dry heating coil 2 and its effect on heat probe 24. Switch 23 differs from switch 21 in that on cooling of its thermally responsive element 24 it does not automatically reclose the circuit, but requires manual operation to close the circuit. The purpose of not permitting automatic reconnection here, is to give ample opportunity to check on the cause of the failure of the other regulators and, if necessary, to repair any damage. Before the temperature switch 23 is actuated ot disconnect, vent valve 25 mechanically blows since its closure pressure is less than the increased pressure corresponding to a steam temperature lying in the range between the disconnect temperature of temperature regulator 21 and temperature disconnect switch 23.

In the event that there should be no pressure within container 1, and the temperature regulator 21 does not function, the temperature disconnect switch 23, which is connected in a circuit containing no other switches, will operate to disconnect the heating coil.

What I claim is:

1. Apparatus for preparing hot beverage coffee comprising a closed container, an electric heating coil within the container adjacent to the bottom thereof, a main electric line adapted to connect the heating coil to a source of electrical potential, a water inlet means connected to a lower region of the container, a vertical riser tube within the container having its open end adjacent to but spaced from the bottom of the container, an outflow tube vertically within the container having a closed top in a horizontal plane above the top of the riser tube and of which the lower open end region extends through the bottom region of the container, a connecting tube interconnecting the top of the riser tube with the region of the outflow tube below the top thereof, the outflow tube having an aperture in the region between its top and the region thereof connected to the connecting tube and above the level of the water to be filled into the container, a vent valve connected to the container at a region thereof above the level to which water is filled, a plunger controlled by a solenoid coil normally closing the vent valve, a closure valve in the water inlet means, a first thermally responsive switch means controlled by the temperature of the heating coil, a second thermally responsive switch means controlled by the temperature of the heating coil, a second thermally responsive switch means controlled by the temperature of the heating coil and serially connected in the main line, a first branch line shunted across the main line, a relay of which the coil is in the first branch line in series with the first thermally responsive switch means, a first pair of spaced contacts in the main line adapted to be bridged by the relay armature on energization of the relay coil, each the first and second thermally responsive switch means being normally in circuit closing position and the first switch means opening the first branch line and by way of the relay the main line when the heating coil reaches a first predetermined temperature and the second switch means opening the main line when the heating coil reaches a second predetermined temperature higher than the first predetermined temperature, a two-position switch, a second branch line connected between the terminal of one position of the two-position switch and one side of the main line, an electric water pump in the second branch line, a third branch line connected between the terminal of the other position of the two-position switch and such one side of the main line, the armature of the two-position switch being connected to the other side of the main line, the solenoid coil being in the third branch circuit, and a mechanical interconnection between the closure valve and the two-position switch such that on opening the closure valve the two-position switch armature opens the third branch circuit, deenergizing the solenoid coil to release the plunger to the vent valve opening position, and closes the second branch circuit actuating the water pump, and on closing the closure valve the two-position switch armature closes the third branch circuit, energizing the solenoid coil to actuate the plunger to the vent valve closing position, and opens the second branch circuit to stop the water pump.

2. Apparatus according to claim 1 in which the first thermally responsive switch means after switching to the line opening position is self restored to line closing position on subsequent decrease of the temperature of the heating coil below the first predetermined temperature while the second thermally responsive switch means after switching to the line opening position remains in such position on subsequent decrease of the heating coil temperature below the second predetermined temperature.

3. Apparatus according to claim 1 in which a self-restoring pressure sensitive means responsive to the pressure prevailing within the container is connected to the container at a region thereof above the level to which water is filled, a second pair of spaced terminals is provided in the first branch circuit, and an armature connected to the pressure sensitive means normally bridges and engages the terminals of the second pair, the pressure sensitive means removing the armature from such terminal engagement at a predetermined pressure within the container to open the first branch circuit and restoring the armature to engagement with the terminals of the second pair when the pressure within the container decreases and is below the predetermined pressure.

4. Apparatus for preparing hot beverage coffee comprising a closed container, an electric heating coil adjacent the container bottom, a main line adapted to connect the heating coil to a source of electrical energy, a water inlet means opening into the container, a riser tube within the container having its open end adjacent to but spaced from the container bottom, an outflow tube within the container having a closed top in a horizontal plane above the top of the riser tube and of which the lower open end region extends through the container bottom region, a connecting tube interconnecting the top of the riser tube with the region of the outflow tube below the top thereof, the outflow tube defining an aperture between its top and the region thereof connected to the connecting tube and above the level to which water is filled into the container, a vent valve and an actuation means controlled by the pressure prevailing within the container are each connected to the container at a region thereof above the level to which the water is filled, a plunger normally closing the vent valve, a solenoid controlling the plunger and on energization holding the plunger in valve closing position with a force substantially equal to the pressure corresponding to the first predetermined temperature, a closure valve in the water inlet means, a first thermally responsive switch means controlled by the temperature of the heating coil, a second thermally responsive switch means controlled by the temperature of the heating coil and serially connected in the main line, a first branch line shunted across the main line, a relay of which the coil is in the first branch line in series with the first thermally responsive switch means, a first pair of spaced contacts in the main line adapted to be bridged by the relay armature on energization of the relay coil, each the first and second thermally responsive switch means being normally in circuit closing position and the first switch means opening the first branch line and by way of the relay the main line when the heating coil reaches a first predetermined temperature and the second switch means opening the main line when the heating coil reaches a second predetermined temperature higher than the first predetermined temperature, a pivoted two-position switch, a second branch line connected between one side of the main line and one of the two positions of such switch, an electrically driven water pump in the second branch line, a third branch line connected between such one side of the main line and the other of the two positions of such switch, the two-position switch armature being connected to the other side of the main line, the solenoid coil being connected in the third branch line, a mechanical interconnection between the water closure valve and the two-position switch such that on opening the closure valve manually the two-position switch opens the third branch line and closes the second branch line thereby opening the vent valve and operating the pump and on shutting the closure valve the two-position switch closes the third branch line and opens the second branch line thereby closing the vent valve and stopping the pump, a second pair of spaced terminals in the first branch line, and an armature connected to the actuation means normally bridges and engages with the terminals of the second pair, the actuation means removing the armature from engagement therewith at the pressure within the container corresponding to the first predetermined temperature and restoring the armature to engagement therewith when the pressure within the container decreases from such pressure so corresponding.

5. Apparatus for preparing hot beverage coffee comprising a closed container, a heating coil cooperating with the container bottom region, a main electric line adapted to connect the heating coil to a source of electrical energy, a water inlet means connected to a lower region of the container, a riser tube within the container having its open end adjacent to but spaced from the container bottom, an outflow tube within the container having a closed top in a horizontal plane above the top of the riser tube and of which the lower open end regions extends through the container bottom region, a connecting tube interconnecting the top of the riser tube with the region of the outflow tube below the top thereof, the outflow tube having an aperture in the region between its top and the point of connection of the interconnecting tube and above the level to which water is filled into the container, a vent valve and an actuating means controlled by the pressure prevailing within the container are each connected to the container at a region thereof above the level to which the water is filled, a first thermally responsive switch controlled by the temperature of the heating coil and serially connected in the main line, a first branch line shunted across the main line, a start switch normally biased to open position and a stop switch normally biased to closure in the first branch line, a common point in the first branch line, a relay, the coil of the relay being in the first branch line in series with the first thermally responsive switch, a first pair of spaced contacts in the main line adapted to be bridged by the armature of the relay on energization of the relay coil, each the first and second thermally responsive switch being normally in the circuit closing position and the first thermally responsive switch opening the first branch line and by way of the relay the main line when the heating coil reaches a first predetermined temperature and the second thermally responsive switch opening the main line when the heating coil reaches a second predetermined temperature higher than the first predetermined temperature, a plunger normally closing the vent valve, a solenoid controlling the plunger, a closure valve in the water inlet means, a two-position switch, a second branch line connected between one side of the main line and one of the positions of the two-position switch, an electrically driven water pump in the second branch line, a third branch line connected between the other of the positions of the two-position switch and the common point, the pivoted end of the armature of the two-position switch being connected to the other side of the main line, the solenoid coil being connected in the third branch line, a mechanical interconnection between the water closure valve and the two-position switch such that on opening the closure valve manually the two-position switch closes the second branch line and opens the third branch line thereby opening the vent valve and operating the pump and on shutting the closure valve the two-position switch opens the second branch line and closes the third branch line thereby closing the vent valve and stopping the pump, a second pair of spaced terminals in the first branch line, an armature connected to the actuating means and normally bridging and engaging the terminals of the second pair, the actuating means removing the armature from engagement therewith at a pressure within the container corresponding to the first predetermined temperature, a fourth branch line between the common point and such other side of the main line, a second relay of which the coil is in the fourth branch line, a fifth branch line between the common point and the side of the start switch remote from the common point and in shunt of the first branch line region in which the start switch is positioned, the armature of the second relay being adapted on energization of the second relay coil to close the fifth branch line so that on pushing the button of the start switch to the closing position the main line and at least the first and fourth branch lines are energized, energization of the second relay coil closing the fifth branch to act as a holding portion maintaining the first branch line energized when the pressure on the button of the start switch is released and the start switch restores to open position until at least one of the actuating means, the first and second thermally responsive switching means, and the stop switch is actuated to open the first branch line and the main line.

References Cited in the file of this patent

UNITED STATES PATENTS

| | | |
|---|---|---|
| 556,081 | Batchelor | Mar. 10, 1896 |
| 1,507,266 | Whittingham | Sept. 2, 1924 |
| 2,046,718 | Bletz | July 7, 1936 |
| 2,088,728 | Stransky | Aug. 3, 1937 |
| 2,424,393 | Graves | July 22, 1947 |
| 2,666,379 | Kaminky | Jan. 19, 1954 |

FOREIGN PATENTS

| | | |
|---|---|---|
| 307,233 | Italy | Apr. 24, 1933 |
| 433,803 | France | Nov. 6, 1911 |
| 782,287 | France | Mar. 11, 1935 |